(12) United States Patent
Medicke et al.

(10) Patent No.: US 7,085,762 B2
(45) Date of Patent: Aug. 1, 2006

(54) METHODS, SYSTEMS AND COMPUTER PROGRAM PRODUCTS FOR WEB SERVICES ACCESS OF ANALYTICAL MODELS

(75) Inventors: John A. Medicke, Raleigh, NC (US); Feng-Wei Chen Russell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 10/443,243

(22) Filed: May 22, 2003

(65) Prior Publication Data

US 2004/0236758 A1 Nov. 25, 2004

(51) Int. Cl.
*G06F 17/30* (2006.01)
(52) U.S. Cl. .......................... 707/6; 707/102; 717/104
(58) Field of Classification Search .................... 707/6, 707/102; 717/104
See application file for complete search history.

(56) References Cited

U.S. PATENT DOCUMENTS

| | | | | |
|---|---|---|---|---|
| 6,240,411 | B1 * | 5/2001 | Thearling | 707/5 |
| 6,338,066 | B1 | 1/2002 | Martin et al. | 707/10 |
| 6,388,592 | B1 | 5/2002 | Natarajan | 341/107 |
| 6,430,615 | B1 | 8/2002 | Hellerstein et al. | 709/224 |
| 6,823,334 | B1 * | 11/2004 | Vishnubhotla et al. | 707/5 |
| 6,912,533 | B1 * | 6/2005 | Hornick | 707/10 |
| 6,920,458 | B1 * | 7/2005 | Chu et al. | 707/102 |
| 2002/0013756 | A1 | 1/2002 | Piccioli | 705/36 |
| 2002/0013760 | A1 | 1/2002 | Arora et al. | 705/37 |
| 2002/0023145 | A1 | 2/2002 | Orr et al. | 709/219 |
| 2002/0046143 | A1 | 4/2002 | Eder | 705/36 |
| 2002/0083067 | A1 | 6/2002 | Tamayo et al. | 707/100 |
| 2002/0099821 | A1 | 7/2002 | Hellerstein et al. | 709/224 |
| 2002/0138455 | A1 | 9/2002 | Abdel-Moneim et al. | 706/15 |
| 2002/0174000 | A1 | 11/2002 | Katz et al. | 705/7 |
| 2002/0174384 | A1 | 11/2002 | Graichen et al. | 714/37 |
| 2003/0065926 | A1 * | 4/2003 | Schultz et al. | 713/188 |
| 2003/0069908 | A1 * | 4/2003 | Anthony et al. | 707/513 |
| 2003/0135509 | A1 * | 7/2003 | Davis et al. | 707/100 |
| 2003/0139907 | A1 * | 7/2003 | McCarthy | 702/183 |
| 2003/0177054 | A1 * | 9/2003 | Reinbold et al. | 705/10 |
| 2003/0195889 | A1 * | 10/2003 | Yao et al. | 707/100 |
| 2003/0220860 | A1 * | 11/2003 | Heytens et al. | 705/35 |
| 2003/0229635 | A1 * | 12/2003 | Chaudhuri et al. | 707/6 |
| 2004/0122844 | A1 * | 6/2004 | Malloy et al. | 707/102 |

OTHER PUBLICATIONS

Convis et al. Research Disclosure for "Development Metrics," Jul. 1989, No. 303.
Lin et al. "A Database Application Generator for the WWW," Journal of the Chinese Institute of Engineers. 1998, vol. 21, No. 3, pp. 337-346.

(Continued)

*Primary Examiner*—Wayne Amsbury

(57) ABSTRACT

Accessing an analytical model is provided by invoking the analytical model hosted by an analytic engine through a web services interface to the analytic engine. Invocation of the analytical model through the web services interface may be independent of the analytic engine hosting the analytical model. Furthermore, the analytical model may be a predictive model markup language (PMML) model. Invoking the analytical model may be provided by creating a set of tables utilized to store model information and parsing a PMML modeling language representation of the analytical model to populate the set of tables. A web services signature is generated for the analytical model based on the populated set of tables.

9 Claims, 10 Drawing Sheets

OTHER PUBLICATIONS

Taylor, Art, "Java-Charging the Data Warehouse," *Database Programming & Design*. 1997, vol. 10, No. 10, p. 58.

Zheng Bin xiang et al. Abstract of "Design of object-oriented data warehouse using snow-star schema: its application in the power system of Bao Steel Group," *Journal of Applied Sciences*. Jun. 2002, vol. 20, No. 2, pp. 165-168.

Lorin et al. "System and Method for Performing Predictive Analysis," U.S. Appl. No. 09/597,629, filed Jun. 20, 2000.

Moore, Bruce. "Automated and Optimized Mass Customization of Direct Marketing Materials," U.S. Appl. No. 09/766,357, filed Jan. 19, 2001.

Pednault, Edwin. "A Method for Constructing Segmentation-Based Predictive Models from Data that is Particularly Well-Suited for Insurance Risk or Profitability Modeling Purpose," U.S. Appl. No. 09/302,154, filed Apr. 29, 1999.

Pednault, Edwin. "Method for Constructing Segmentation-Based Predictive Models," U.S. Appl. No. 10/096,474, filed Mar. 11, 2002.

Zupan et al. "Orange and Decisions-at-Hand: Bridging Predictive Data Mining and Decision Support," Proc. of ECML/PKDD2001 Workshop on Integrating Aspects of Data Mining, Decision Support and Meta-Learning Workshop Notes, Prague 2001.

Crudden et al. "Evaluation of Predictive Models Produced by Datamining," *IBM Research Disclosure*, Jun. 2000, p. 1139.

* cited by examiner

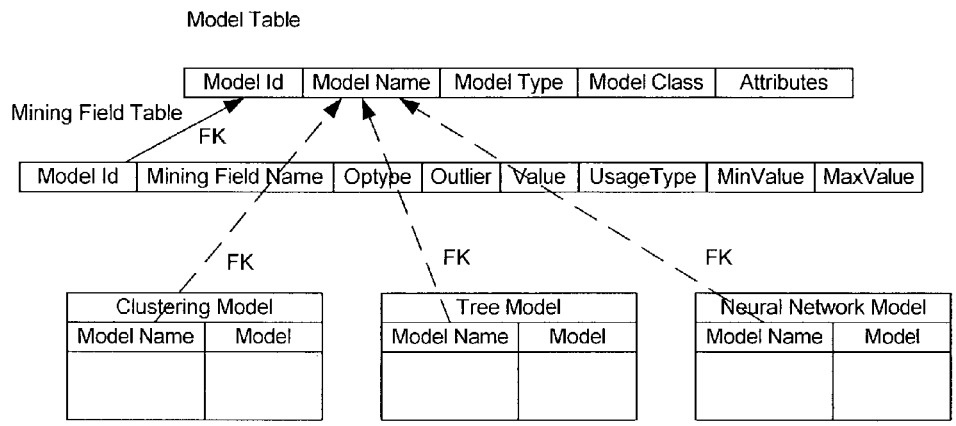

Figure 8

Model Table

| Model Id | Model Name | Model Type | Model Class | Attributes |
|---|---|---|---|---|
| 1 | Banking | Clustering | distributionBased | Number of cluster=9 |
| 2 | Health | Tree | N/A | |
| 3 | Neural FA | Neural Net | N/A | activationFunction=logistic |

Mining Field Table

| Model Id | Mining Field Name | Optype | Outlier | Value | UsageType | MinVal | MaxVal |
|---|---|---|---|---|---|---|---|
| 1 | Income | continuous | asMissingValues | N/A | N/A | 2 | 198170 |
| 1 | Color | categorical | asMissingValues | blue, pink,... | | N/A | N/A |
| 1 | Age | continuous | asMissingValues | N/A | | 0.2 | 88.2 |
| 1 | Siblings | continuous | asMissingValues | | | 0 | 9 |
| 1 | product | categorical | asMissingValues | 1 | Supplementary | N/A | N/A |
| 3 | Blood pressure | continuous | N/A | N/A | active | 9.0 | 220 |
| 3 | ECG | categorical | N/A | 0,1,2 | active | | |
| 3 | thal | categorical | N/A | 3,6,7 | active | N/A | N/A |
| 3 | diseased | categorical | N/A | Y,N | predicted | N/A | N/A |

| Clustering Model FK | |
|---|---|
| Model Name | Model |
| Banking | BLOB |

| Tree Model | |
|---|---|
| Model Name | Model |
| Health | BLOB |

| Neural Network Model | |
|---|---|
| Model Name | Model |
| Neural FA | BLOB |

Figure 10

```
<PMML version="1.1">
  - <Header copyright="Copyright IBM Corp. 2001, All Rights Reserved">
      <Application name="IBM Intelligent Miner Scoring" version="7.1" />
    </Header>
  - <DataDictionary numberOfFields="5">
    - <DataField name="colour" optype="categorical">
        <Value value="red" />
        <Value value="blue" />
        <Value value="pink" />
        <Value value="green" />
        <Value value="purple" />
      </DataField>
    - <DataField name="product" optype="categorical">
        <Value value="1" />
      </DataField>
      <DataField name="Age" optype="continuous" />
      <DataField name="Siblings" optype="continuous" />
      <DataField name="income" optype="continuous" />
    </DataDictionary>
  - <ClusteringModel modelName="banking modeling" modelClass="distributionBased"
      numberOfClusters="9">
    - <MiningSchema>
        <MiningField name="colour" outliers="asMissingValues" />
        <MiningField name="product" usageType="supplementary"
            outliers="asMissingValues" />
        <MiningField name="Age" outliers="asMissingValues" />
        <MiningField name="Siblings" outliers="asMissingValues" />
        <MiningField name="income" outliers="asMissingValues" />
      </MiningSchema>
      <UnivariateStats field="Age">
        <Counts totalFreq="256" />
        <NumericInfo minimum="0.2" maximum="88.2" />
        ..........
      </UnivariateStats>
      <UnivariateStats field="Siblings">
        <Counts totalFreq="256" />
        <NumericInfo minimum="0" maximum="9" />
        ..........
      </UnivariateStats>
      <UnivariateStats field="income">
        <Counts totalFreq="256" />
        <NumericInfo minimum="2" maximum="198170" />
        ..........
      </UnivariateStats>
```

Figure 9

METHODS, SYSTEMS AND COMPUTER PROGRAM PRODUCTS FOR WEB SERVICES ACCESS OF ANALYTICAL MODELS

FIELD OF THE INVENTION

The present invention relates to data warehouses and more particularly to the analysis of data warehouses.

BACKGROUND OF THE INVENTION

With increases in the use of computers to collect and store data and with increases in computer based transactions, such as over the Internet, there has been a proliferation of databases containing large amounts of historical data commonly referred to as "data warehouses." For example, as more and more data is collected regarding consumer purchase and/or shopping habits, this data may be stored in a data warehouse for subsequent analysis. Other uses of data warehouses include, for example, data warehouses of genetic or other scientific data.

While the particular data may vary for different data warehouses, in general, data warehouses are databases of historical data that may utilize a "star-schema" database structure. A data warehouse is typically present to users through a multi-dimensional hypercube and provides an ad hoc query environment. Furthermore, the data warehouse will, typically, contain a large amount of data and have a complex structure.

Analytical models, such as predictive analytical models are conventionally used to analyze data in a data warehouse. Scoring of records against a predictive model, for example, may be provided by a scoring engine. Such application of a predictive model to a database record may be provided, for example, through the use of a Predictive Model Markup Language (PMML) file that defines the application of a model to data. However, invocation of these PMML files is typically platform and/or system dependent such that the necessary operations to invoke a predictive model in one platform and/or system may not function to invoke the predictive model in a different platform and/or system. Thus, models and/or PMML files may be platform and/or system specific, which may reduce the ability to provide best-practices models that may be deployed across different platforms and/or systems.

For example, conventionally, to score a record using DB2 Intelligent Miner for Scoring, a DB2 environment is typically needed to utilize the User Defined Function (UDF)/User Defined Type (UDT) information and apply that information to specific data. Thus, if a DB2 environment is unavailable to a user, scoring of a record may be impossible for that user.

Furthermore, with conventional models and scoring, there is typically no validation mechanism to check the input parameter(s) provided to the model or scoring engine. Accordingly, erroneous results could be returned that may cause undesirable actions to occur.

SUMMARY OF THE INVENTION

Embodiments of the present invention provide methods, systems, and computer program products for accessing an analytical model by providing a web services abstraction of the analytical model so as to allow invocation of the analytical model hosted by an analytic engine through a web services interface to the analytic engine. Invocation of the analytical model through the web services interface may be independent of the analytic engine hosting the analytical model. Furthermore, the analytical model may be a predictive model markup language (PMML) model.

In particular embodiments of the present invention, the web services abstraction may be automatically generated by creating a set of tables utilized to store model information and parsing a PMML modeling language representation of the analytical model to populate the set of tables. A web services signature is then generated for the analytical model based on the populated set of tables.

In further embodiments of the present invention, the set of tables created includes a model table, a mining field table associated with the model table and physical model tables. The physical model tables may include a cluster model table, a tree model table and/or a neural network model table. The model table may contain model identification, model name, model type, model class and attributes fields. The mining field table may contain model id, mining field name, optype, outlier, value, usage type, minimum value, maximum value and active fields. The physical model tables may each include model name and model fields.

In additional embodiments of the present invention, parsing the PMML modeling language representation of the analytical model to populate the set of tables includes extracting information from the PMML modeling language representation to populate the model table and the mining input constraints table. The information may be extracted by parsing elements with a model tag to extract the model type and storing the model type in the model type field of the model table and parsing the element with the model tag to extract attributes and storing the attributes in the attributes field of the model table. Extraction of the information may also include aggregating values from a value attribute to store a list of candidates if an optype is categorical and parsing a field for minimum and maximum values if an optype of a value attribute is continuous.

In particular embodiments of the present invention, generating a web services signature is provided by importing mining models to respective ones of the physical model tables, generating a Java bean to wrap around an invocation statement associated with invocation of the analytical model based on the populated tables, generating a web services document based on the generated Java bean and publishing the generated web service document. Generation of a Java bean may be provided by, for each model in the model table, querying the model and model input constraint tables to retrieve parameters to be applied to the analytical model. A Java bean method is generated to serve as a signature for the analytical model, the signature including a list of the retrieved parameters. Validation logic is generated for inputs based on model constraints. An invocation statement, such as an apply SQL statement, is generated to invoke the analytical model and retrieve results of invocation of the analytical model.

In still other embodiments of the present invention, a system for accessing an analytic model is provided that includes a predictive model markup language (PMML) interrogator configured to parse a PMML file associated with the analytical model and populate tables with information about the analytical model. A bean creator is configured to generate a Java bean to wrap an invocation statement, such as a SQL statement, that invokes the analytical model based on the populated tables. A bean to web services circuit is configured to transform the Java bean to a web services document so as to allow the analytical model to be invoked by a web services interface.

The tables populated by the PMML interrogator may include a model table and a mining field table associated with the model table. Physical model tables may also be provided and may include a cluster model table, a tree model table and/or a neural network model table. The model table may contain model identification, model name, model type, model class and attributes fields. The mining field table may contain model id, mining field name, optype, outlier, value, usage type, minimum value, maximum value and active fields. The physical model tables may each include a model name field and a model field.

In further embodiments of the present invention, the PMML interrogator is further configured to extract information from the PMML file to populate the model table and the mining input constraints table. The PMML interrogator may be configured to parse elements with a model tag to extract the model type, to store the model type in the model type field of the model table, parse the element with the model tag to extract attributes and to store the attributes in the attributes field of the model table. The PMML interrogator may be further configured to aggregate values from a value attribute to store a list of candidates if an optype is categorical and to parse a field for minimum and maximum values if an optype of a value attribute is continuous.

In additional embodiments of the present invention, the bean creator is further configured to import mining models to respective ones of the physical model tables. The bean creator may also be configured to query the model and model input constraint tables to retrieve parameters to be applied to the analytical model, generate a Java bean method to serve as a signature for the analytical model, the signature including a list of the retrieved parameters, generate validation logic for inputs based on model constraints, to generate an invocation statement, such as an apply SQL statement, to invoke the analytical model and to retrieve results of invocation of the analytical model.

As will further be appreciated by those of skill in the art, while described above primarily with reference to method aspects, the present invention may be embodied as methods, apparatus/systems and/or computer program products.

BRIEF DESCRIPTION OF THE DRAWINGS

FIG. 8 is a diagram of table structures suitable for use in embodiments of the present invention;

FIG. 9 is a listing of exemplary XML from a PMML file; and

FIG. 10 is a diagram of a populated table structure for illustrating embodiments of the present invention.

DETAILED DESCRIPTION OF THE INVENTION

Figure 1:
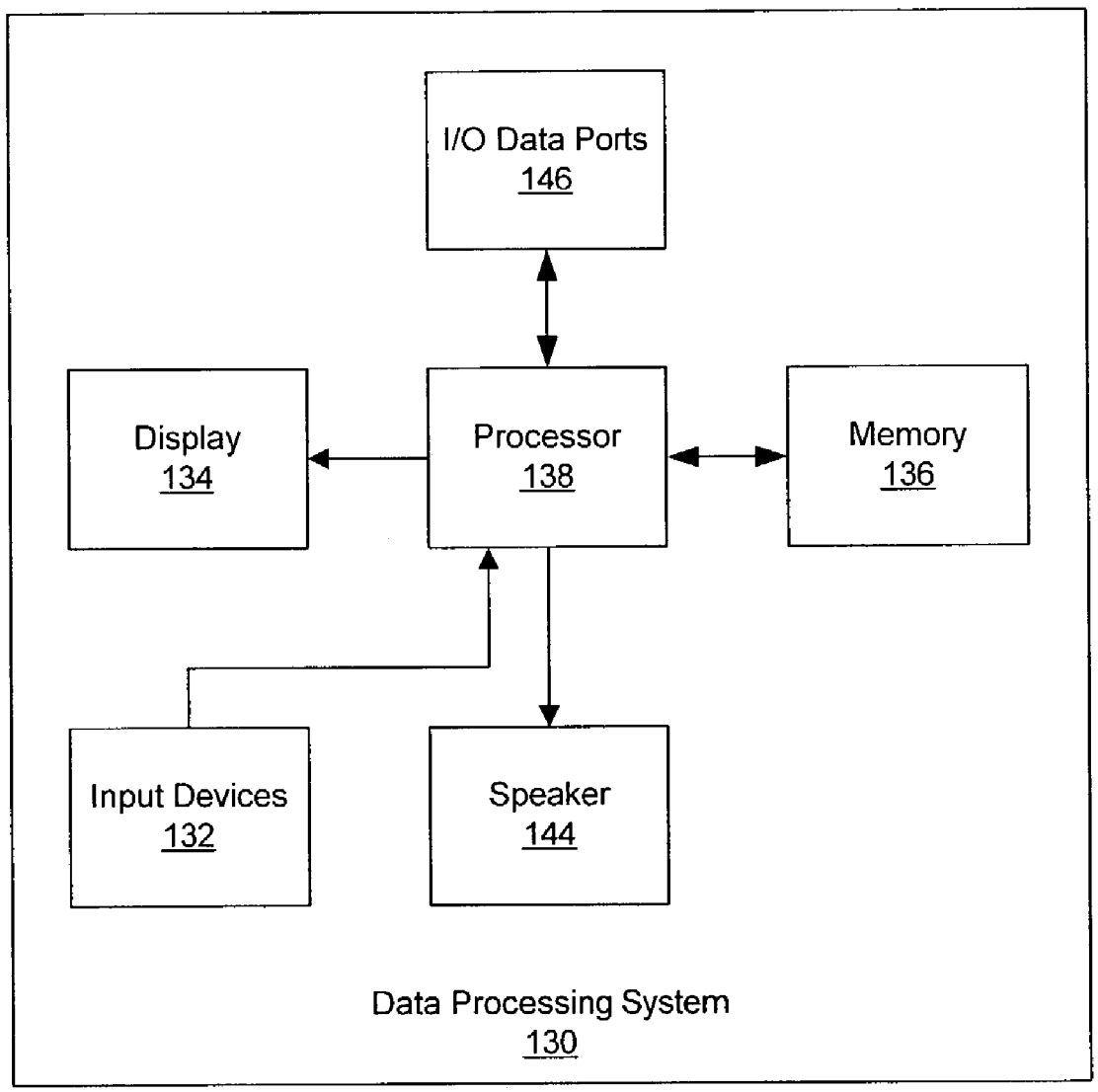
FIG. 1 is a block diagram of a data processing system suitable for use in embodiments of the present invention.

The present invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

Various embodiments of the present invention will now be described with reference to the figures. FIG. 1 illustrates an exemplary embodiment of a data processing system 130 suitable for use in accordance with embodiments of the present invention. The data processing system 130 typically includes input device(s) 132 such as a keyboard or keypad, a display 134, and a memory 136 that communicate with a processor 138. The data processing system 130 may further include a speaker 144, and an I/O data port(s) 146 that also communicate with the processor 138. The I/O data ports 146 can be used to transfer information between the data processing system 130 and another computer system or a network. These components may be conventional components, such as those used in many conventional data processing systems, which may be configured to operate as described herein.

Figure 2:
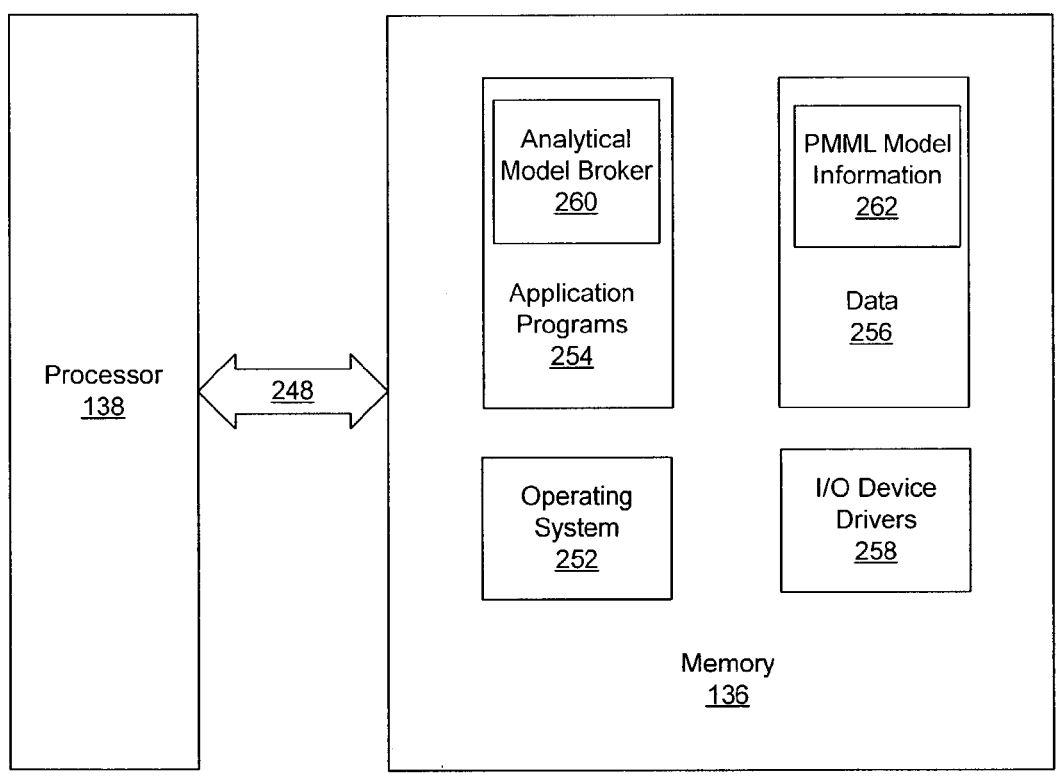
FIG. 2 is a more detailed block diagram of a system according to embodiments of the present invention.

FIG. 2 is a block diagram of data processing systems that illustrates systems, methods, and computer program products in accordance with embodiments of the present invention. The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 130. The memory 136 can include, but is not limited to, the following types of devices: cache, ROM, PROM, EPROM, EEPROM, flash memory, SRAM, and DRAM.

As shown in FIG. 2, the memory 136 may include several categories of software and data used in the data processing system 130: the operating system 252; the application programs 254; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wa., Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the data processing system 130 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

As is further seen in FIG. 2, the application programs 254 may include an analytical model broker module 260 according to embodiments of the present invention. The analytical model broker module 260 may provide a web services abstraction of analytical models that may be used to invoke the analytical models through a web services interface/system. The data portion 256 of memory 136, as shown in the embodiments of FIG. 2, may include PMML model information 262 that may be used to provide web services access to analytical models by the analytical model broker module 260 as described herein.

While the present invention is illustrated, for example, with reference to the analytical model broker module 260 being an application program in FIG. 2, as will be appreciated by those of skill in the art, other configurations may also be utilized while still benefitting from the teachings of the present invention. For example, the analytical model broker module 260 may also be incorporated into the operating system 252 or other such logical division of the data processing system 130. Thus, the present invention should not be construed as limited to the configuration of FIG. 2 but is intended to encompass any configuration capable of carrying out the operations described herein.

Furthermore, while the analytical model broker module 260 is illustrated in a single data processing system, as will be appreciated by those of skill in the art, such functionality may be distributed across one or more data processing systems. Thus, the present invention should not be construed as limited to the configuration illustrated in FIGS. 1 and 2 but may be provided by other arrangements and/or division of function between data processing systems.

Figure 3A:
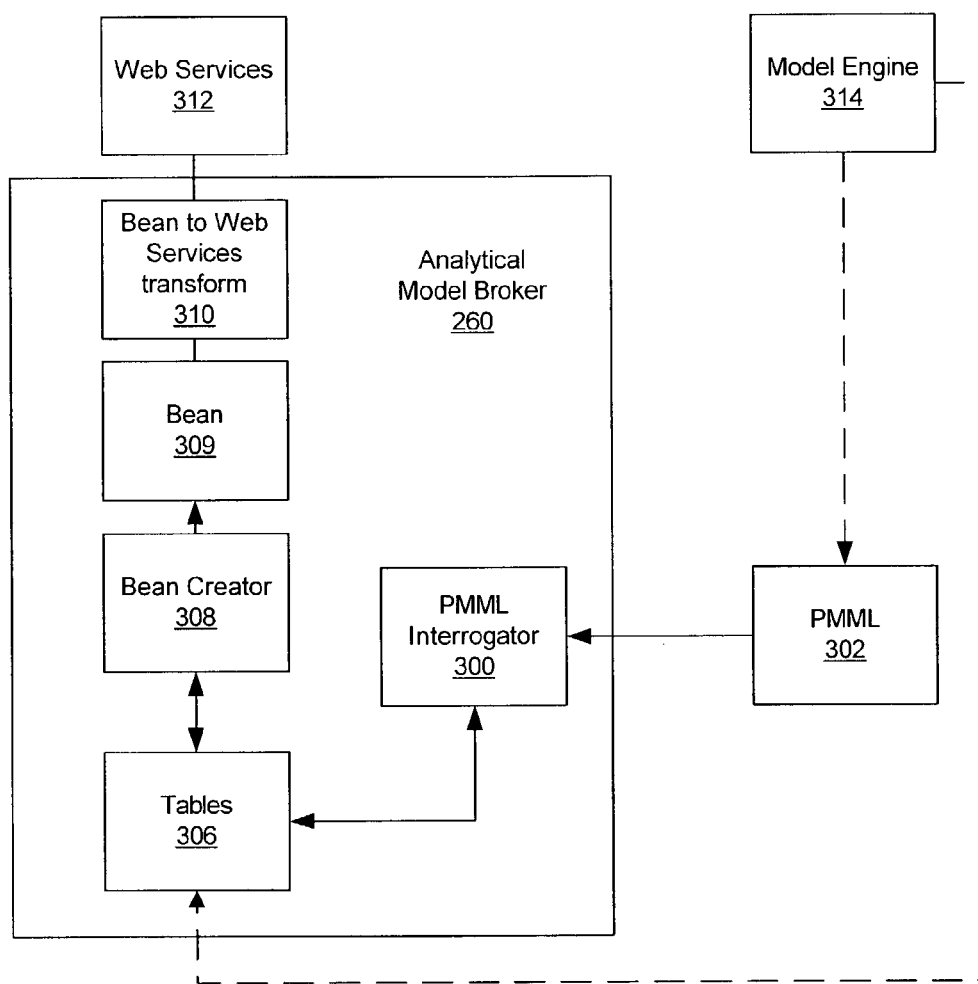
FIGS. 3A and 3B are block diagrams of web services systems according to embodiments of the present invention.
Figure 3B:
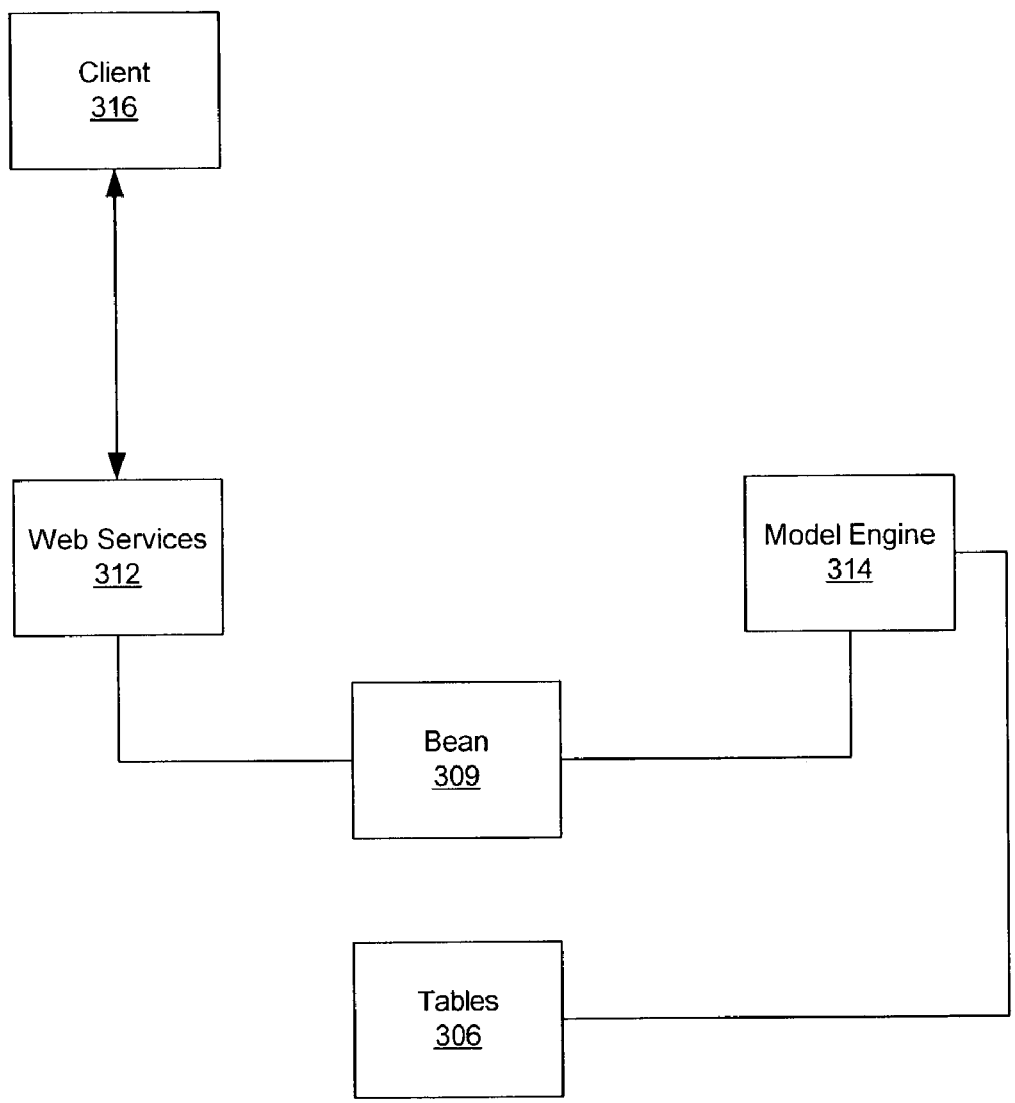

FIGS. 3A and 3B are block diagrams of systems incorporating an analytical model broker 260 according to embodiments of the present invention. As illustrated in FIGS. 3A and 3B, embodiments of the present invention may provide a client 316 access to a model engine 314 through web services 312. The web services 312 may, for example, be provided by a WebSphere Application Server from International Business Machines, Armonk, N.Y., or other such web services systems known to those of skill in the art. The model engine 314 may, for example, be a data mining and/or scoring engine that may score, rank and/or classify data records. For example, the model engine 314 may be DB2 Intelligent Mining Scoring Engine from International Business Machines, Armonk, N.Y.

As is further illustrated in FIG. 3A, a PMML file 302, which may be generated by the model engine 314 or otherwise provided, is parsed by a PMML interrogator 300 to extract information about the analytical model reflected in the PMML file. The information stored in the PMML file may be stored in an XML or other such mark-up language format. The extracted information may be stored in tables 306 that contain information about the model, such as input parameters, permissible ranges, model identifiers, types and names and the like. Furthermore, the tables 306 may also include a copy of the model itself, for example, stored as a binary large object (BLOB).

The bean creator 308 utilizes information in the tables 306 to generate a Java bean 309 that wraps a database invocation statement, such as an SQL statement, that invokes the model. The bean creator 308 may, for example, generate parameter lists and validation logic for inputs so as to provide input validation through the web services 312. The bean 309 created by the bean creator 308 is transformed by the bean to web services transformer 310 that packages the created Java bean for deployment through the web services 312. For example, a Java bean may be transformed by the WebSphere Studio Application Developer (WSAD) from International Business Machines, Armonk, N.Y., to provide web services description language (WSDL) and deployment descriptor files. WSAD may also package the Java bean into Java 2 Enterprise Edition (J2EE) compliant web application archive (WAR) file or enterprise archive (EAR) file to be deployed by a web application server.

As seen in FIG. 3B, when the client 316 accesses the web services 312 to invoke the model, the created bean 309 is accessed with information from the client 316 so as to invoke the model with the model engine 314. The model engine 314 accesses the physical table of the tables 306 to obtain the model and executes the model. The physical table may be directly and/or indirectly accessed by the model engine 314.

Figure 4:
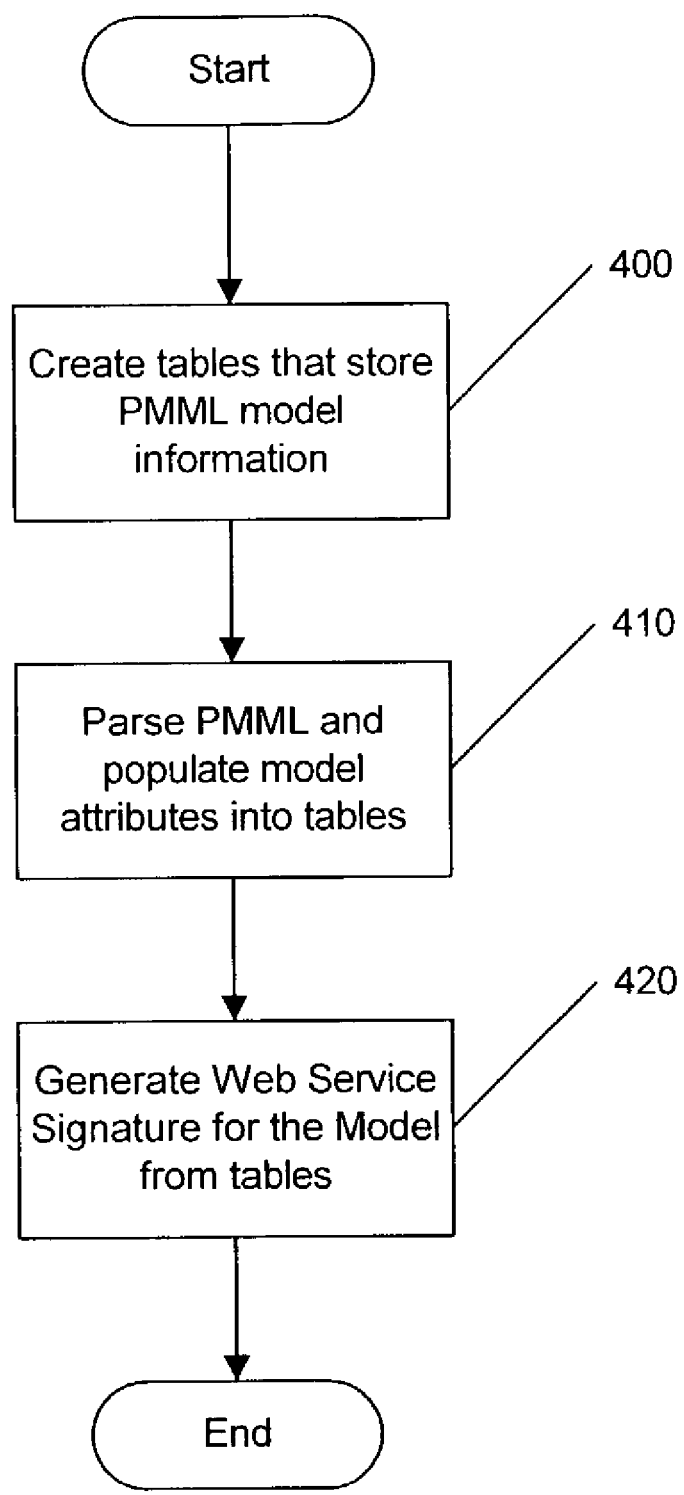
FIG. 4 is flowchart illustrating operations according to embodiments of the present invention.

FIG. 4 illustrates operations of an analytical model broker 260 according to embodiments of the present invention. As seen in FIG. 4, tables, such as the tables 306 of FIG. 3, are created that store PMML model information (block 400). FIG. 8 illustrates exemplary tables the may be created according to particular embodiments of the present invention. In particular, a Model Table, a Mining Field Table and physical model tables may be created to store information from the PMML file. As illustrated in FIG. 8, the Model Table may include the following fields (columns):

Model Id: the unique id to identify the model;
Model Name: the unique name of the model;
Model Type: the type of the model;
Model Class: the class type of the model; and
Attributes: the unique attributes belonging to the model.

The Mining Field Table may include the following fields (columns):

Model id: the unique id to identify the model (Foreign key to Model Table);
Mining Field Name: mining data input parameter;
Optype: the mining data type;
Outlier: the type and treatment of the outlier;
Value: the categorical values;
Usage Type: the usage type of this mining field; it can be, for example, active, predicted or supplementary;
MinValue: the minimum value for the mining field; and
MaxValue: the maximum value for the mining field.

Different physical model tables may be provided for differing types of models. For example, as illustrated in FIG. 8, a Clustering Model Table may be provided that includes fields (columns):

Model Name: the name of the model (Foreign key to Model Table); and
Model: the model content in BLOB format.

Similarly, a Tree Model table and a Neural Network Model table may also be provided that include Model Name and Model fields (columns).

As is further seen in FIG. 8, the Model Id may be a key for the Model Table and a foreign key FK for the Mining Field Table. The Model Name field of the Model Table may be a foreign key FK for the physical tables, such as the Clustering Model table, the Tree Model table and the Neural Network Model table.

Returning to FIG. 4, a PMML file is parsed, for example, by the PMML Interrogator 300 of FIG. 3, to populate model attributes into the created tables (block 410). An example of a PMML file is illustrated in FIG. 9 and the corresponding populated tables are illustrated in FIG. 10. A web services signature is created for the model based on the populated tables (block 420), for example, by the bean creator 308 and bean to web services transformer 310 of FIG. 3. For example, such a web services signature may be used by the client 316 to invoke the analytical model, where access to the analytic engine 314 hosting the model is provided through the web services 312.

Figure 5:
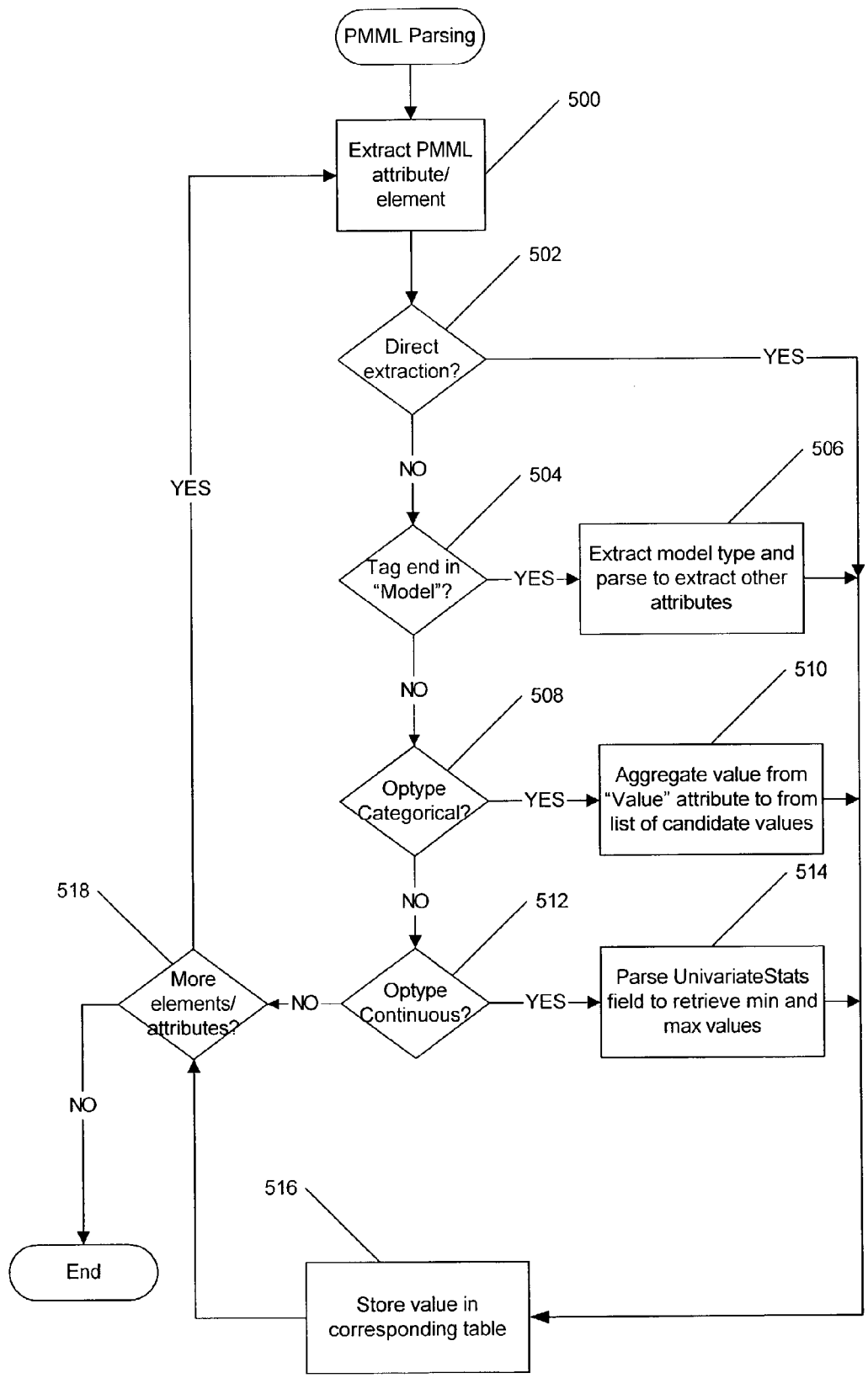
FIG. 5 is a flowchart illustrating operations for PMML parsing according to further embodiments of the present invention.

FIG. 5 illustrates operations of particular embodiments of the present invention for parsing and extracting PMML model information from the PMML model file at block 410 of FIG. 4. In extracting PMML model information from the PMML model file, some of the information may be directly mapped to fields of the Model Table and the Mining Field Table while other information is generated based on information in the PMML model file. Table 1 illustrates a mapping between PMML model file information and entries in the exemplary Model Table and Mining Field Table.

TABLE 1

PMML to Table Mapping

| PMML DTD | Table.column |
| --- | --- |
| %Model.modelName | Model.Model_name |
| %Model | Model.Model_type |
| %Model.modelClass | Model.Model_class |
| %Model.attributes | Model.Attributes |
| DataField.name | Mining Field.Mining_Field_name |
| DataField.optype | Mining Field.optType |
|  | Can be in one of the following: (categorical | ordinal | continuous) |
| %Model.MiningField.outliers | Mining Field.Outlier |
| DataField.value | Mining Field.Value |
| %Model.MiningField.usageType | Mining Field.Usage_type |
| UnivariateStats.field.NumericInfo. minimum | Mining Field.MinValue |
| UnivariateStats.field.NumericInfo. maximum | Mining Field.MaxValue |

Of the PMML information, each of the PMML data directly maps to the corresponding table except for % Model, % Model.attributes and DataField.value. The entries corresponding to this PMML information are generated as the PMML model file is parsed. Operations for such parsing and generation are illustrated in FIG. 5.

As seen in FIG. 5, a PMML attribute/element is extracted from the PMML file (block 500). If the PMML attribute/element corresponds to PMML information that is directly mapped to a corresponding table field (block 502), the extracted value is stored in the corresponding table (block 516). For example, the PMML file is parsed for the %Model.MiningField.usageType field and that information is directly mapped to the Usage Type field of the Mining Field Table. Thus, the Usage Type may be active, supplementary, predicted or not specified. If more elements/attributes are present (block 518), the next element/attribute is extracted from the PMML file (block 500) and operations continue with block 502. Otherwise, parsing of the PMML file and population of the tables is complete.

If the PMML attribute/element does not correspond to PMML information that is directly mapped to a corresponding table field (block 502), it is determined if the tag of the extracted PMML attribute/element ends in "Model" (block 504). If the tag of the extracted PMML attribute/element ends in "Model" (block 504), the PMML attribute/element is parsed to extract the model type (block 506). Candidates for the model type may include, for example, any of the following model types: TreeModel, NeuralNetwork, ClusteringModel, RegressionModel, GeneralRegressionModel, AssociationModel. Furthermore, attributes associated with the element are parsed to extract attributes other than modelName and modelClass (block 506). The model type is stored in the Model Type field of the Model Table and the other attributes are stored in the Attribute field of the Model Table (block 516). If more elements/attributes are present (block 518), the next element/attribute is extracted from the PMML file (block 500) and operations continue with block 502. Otherwise, parsing of the PMML file and population of the tables is complete.

If the tag does not end in "Model" (block 504), the value of DataField.optype is also evaluated and, if equal to "Categorical" (block 508), then the values from Value attribute are aggregated to form a list of candidate values (block 510). The aggregated candidate values are stored in the Value field of the Mining Field Table (block 516). If more elements/attributes are present (block 518), the next element/attribute is extracted from the PMML file (block 500) and operations continue with block 502. Otherwise, parsing of the PMML file and population of the tables is complete.

If the value of DataField.optype is not "Categorical" (block 508), but is equal to "Continuous" (block 512), then the UnivariateStats field is parsed to retrieve the minimum and maximum values (block 514). The minimum and maximum values are stored in the respective min and max value fields of the Mining Field Table (block 516). If more elements/attributes are present (block 518), the next element/attribute is extracted from the PMML file (block 500) and operations continue with block 502. Otherwise, parsing of the PMML file and population of the tables is complete. If the value of DataField.optype is not equal to "Continuous" (block 512), operations proceed to block 518 as described above.

An example of populated tables as a result of the parsing illustrated in FIG. 5 is seen in FIG. 10. The tables in FIG. 10 were populated based on the example PMML file of FIG. 9. In the example PMML file illustrated in FIG. 9, ClusteringModel, numberOfCluster=9 will be stored in the appropriate fields as illustrated in the populated tables of FIG. 10. Furthermore, Income field has an optype of continuous, so the minimum value of 2 and the maximum value of 198170 are extracted and stored in the Mining Field Table fields of MinVal and MaxVal. The Color field has an optype of categorical, so the candidate values of blue, pink, etc. are stored in the Value field of the Mining Field Table. Additional parsing and population of the tables is also illustrated by FIGS. 9 and 10.

Figure 6:
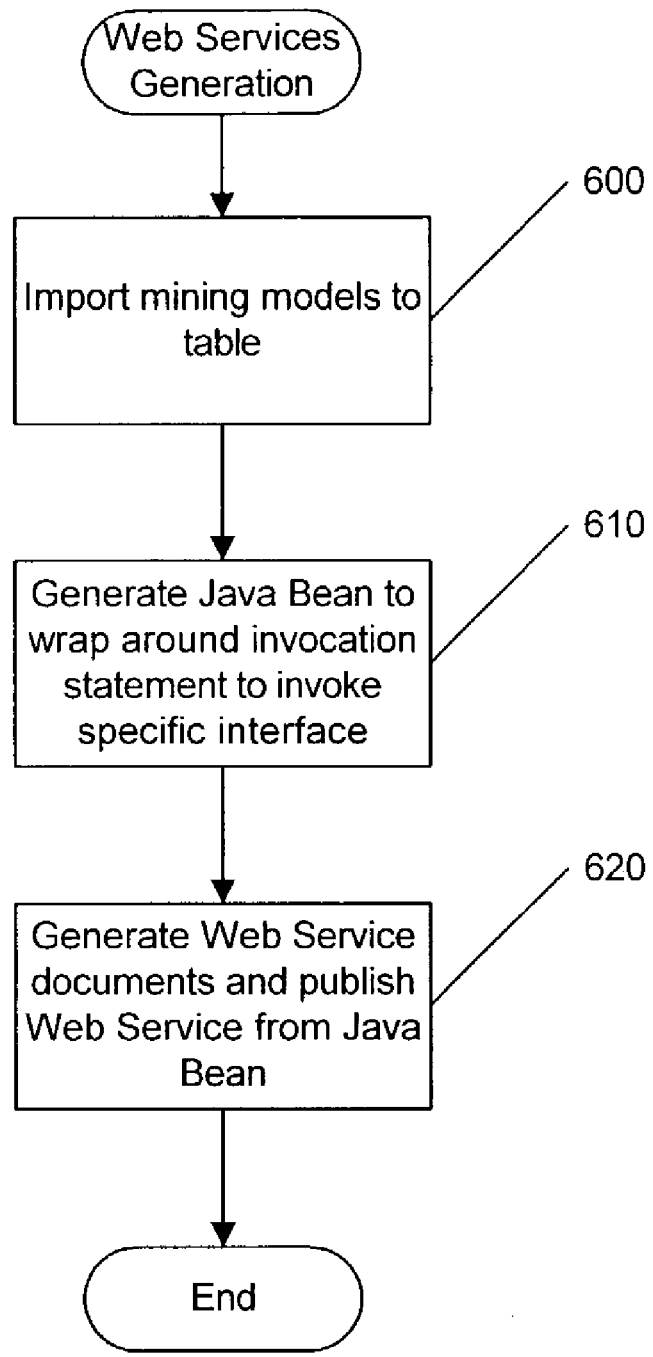
FIG. 6 is a flowchart illustrating operations for web services generation according to embodiments of the present invention.
Figure 7:
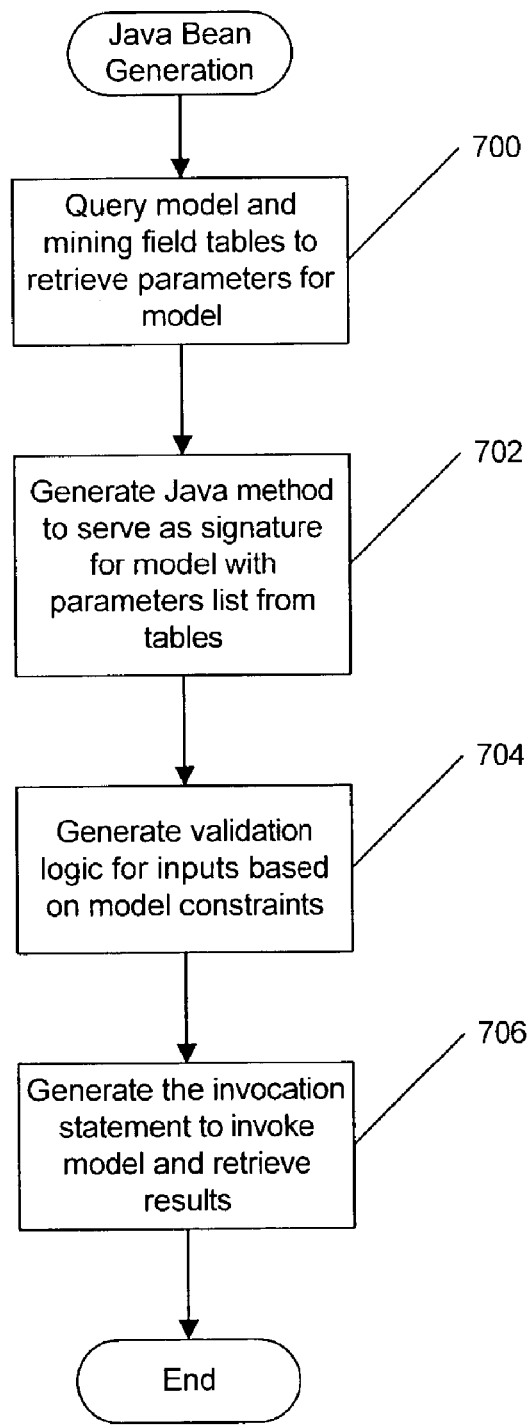
FIG. 7 is a flowchart illustrating operations for Java bean generation according to embodiments of the present invention.

FIG. 6 illustrates operations for the generation of a web services signature as reflected in block 420 of FIG. 4 according to particular embodiments of the present invention. As seen in FIG. 6, the analytical models, such as mining models, are imported to the model field of their respective physical tables (block 600). For example, the mining models may be imported as a binary large object (BLOB) of the model. In particular, the Store Procedure provided with DB2 Intelligent Mining Scoring may be used to import the model into its corresponding model table. For example, the Store Procedure may be used to insert into IDMMX.ClusterModels values as follows:

('DemoBankingPMML',IDMMX.DM_impClusFileE
   ('C:\imv6.1\PMMLTOOL\profile\bankcluster.xml','is
   o-8859-1'));

A Java bean is also generated to wrap around an invocation statement, such as a SQL select statement, that invokes the analytical model (block 610). Operations according to particular embodiments of the present invention for generating the Java bean are illustrated in further in FIG. 7. As seen in FIG. 7, the Model Table and the Mining Field Table are queried to retrieve parameters for the model (block 700). A Java bean method is generated with the parameters list retrieved from the tables to serve as a signature for the model (block 702). Validation logic for inputs is generated based on the model constraints retrieved from the Mining Field Table and incorporated in the Java bean (block 704). For example, validation logic may be provided to confirm that values for a field are between the minVal and maxVal values or that an input is one of a number of enumerated candidates for a categorical optype. An invocation statement, such as an apply SQL statement, is also generated and incorporated in the Java bean that will invoke the model and apply the set of data to a model to score/rank/classify the set of data and retrieve the results (block 706).

In the example illustrated in FIGS. 8–10, the following Java code may be generated to provide the Java bean:

```
Public class BankingClusterModel
{
    public BankingClusterModel( )
    {
    }
    public ScoreResult score(type, age, siblings, income,
    product)
    {
        //assume that product ==null, the SQL generated will be
        similar to the following
        Validate the input parameter value
        SQL query="
        with clusterView( clusterResult ) as
        (
        select IDMMX.DM_applyClusModel( c.model ,
        IDMMX.DM_applData(
        IDMMX.DM_applData(
        IDMMX.DM_applData(
        IDMMX.DM_applData(
        'colour', "+type +"),
        'AGE', "+age+"),
        'SIBLINGS', "+siblings +"),
        'INCOME', "+income +"))
        from IDMMX.clustermodels c where
        c.modelname='DemoBankingPMML'
        )
        select IDMMX.DM_getClusterID( clusterResult ),
        IDMMX.DM_getClusScore( clusterResult )
        from clusterView where IDMMX.DM_getClusScore(
        clusterResult )>0.7;"
    execute SQL statement......
    }
}
```

Returning to FIG. 6, a web services document is generated from the Java bean and published (block 620). In particular, as discussed above, WSAD may be used to generate a set of WSDL and Deployment Descriptor file. WSAD can also package the Java Bean into J2EE compliant WAR file or EAR file to be deployed to a Web Application Server. The WSDL and Deployment Descriptor file are provided to a web services system, such as the web services 312.

Thus, as illustrated in FIGS. 1 through 10, a PMML file may be transformed into Web Services so there is no platform, language and/or database dependency between the client application and the scoring engine. Moreover, a set of input parameter validation rules may be derived from the model and stored. At run time, Web Service can programmatically and systematically validate the input value and type to limit or prevent invalid inputs and, accordingly, erroneous results. Particular embodiments of the present invention may be particularly well suited to e-commerce, business-to-business (B2B) and/or business-to-customer (B2C) environments where a user can invoke a Web Service to score/rank/classify a record by applying a set of data to the model previously harvested from a mining engine. Embodiments of the present invention may also provide an e-utility center where a center service provider can serve differing types of mining models so that scoring information can be shared and distributed over the network and/or enterprise.

Embodiments of the present invention may create a framework that may increase the exploitation of mining and analytic intellectual capital by enabling easier utilization of analytic services across a broad range of business applications. An environment may be created where mining experts can be employed to develop best-practices industry models without being required to participate in every analytic deployment. An e-Utility approach to analytic models may facilitate integrated real-time analytics where models can be invoked real-time from, for example, operational WebSphere applications and business processes. Furthermore, embodiments of the present invention may allow a model generated to be ubiquitously scored and may reduce or eliminate cross-platform or cross-language limitations for applying models, based on the nature of Web Services. Embodiments of the present invention may also provide a central repository to validate the data type, range, and value for the parameters checking when Web Services are invoked. Embodiments of the present invention could also be utilized to produce a list of statistics on models based on their type, attributes, and values, etc. through, for example, evaluation of the tables generated through parsing of the PMML files.

The flowcharts and block diagrams of FIGS. 1 through 10 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

In the drawings and specification, there have been disclosed typical illustrative embodiments of the invention and, although specific terms are employed, they are used in a generic and descriptive sense only and not for purposes of limitation, the scope of the invention being set forth in the following claims.

What is claimed is:

1. A method of programmatically accessing an analytical model, comprising:
    programmatically providing a web services abstraction of the analytical model so as to allow invocation of the analytical model hosted by an analytic engine through a web services interface to the analytic engine; wherein:
    the analytical model is a predictive model markup language (PMML) model;
    providing a web services abstraction comprises automatically generating a web services abstraction of the analytical model by:
        creating a set of tables utilized to store model information;
        parsing a PMML modeling language representation of the analytical model to populate the set of tables; and
        generating a web services signature for the analytical model based on the populated set of tables;
    creating a set of tables utilized to store model information comprises:
        creating a model table containing model identification, model name, model type, model class and attributes fields;
        creating a mining field table associated with the model table, the mining field table containing model id, mining field name, optype, outlier, value, usage type, minimum value and maximum value fields; and
        creating physical model tables, each including a model name field and a model field;
    parsing a PMML modeling language representation of the analytical model to populate the set of tables comprises extracting information from the PMML modeling language representation to populate the model table and the mining input constraints table, wherein extracting information further comprises:
        parsing elements with a model tag to extract the model type and storing the model type in the model type field of the model table; and
        parsing elements with the model tag to extract attributes and storing the attributes in the attributes field of the model table;
    wherein extracting information further comprises:
        aggregating values from a value attribute to store a list of candidates if an optype is categorical; and
        parsing a univariate stats field for minimum and maximum values if an optype of a value attribute is continuous.

2. The method of claim 1, further comprising invoking the analytical model through the web services interface independent of the analytic engine hosting the analytical model.

3. The method of claim 1, wherein the physical model tables include a cluster model table, a tree model table and/or a neural network model table.

4. The method of claim 1, wherein generating a web services signature comprises:
    importing mining models to respective ones of the physical model tables;
    generating a Java bean to wrap around an invocation statement associated with invocation of the analytical model based on the populated tables;
    generating a web services document based on the generated Java bean; and
    publishing the generated web service document.

5. The method of claim 4, wherein generating a Java bean comprises carrying out the following for a model in the model table:
    querying the model and model input constraint tables to retrieve parameters to be applied to the analytical model;
    generating a Java bean method to serve as a signature for the analytical model, the signature including a list of the retrieved parameters;
    generating validation logic for inputs based on model constraints; and
    generating an invocation statement to invoke the analytical model and retrieve results of invocation of the analytical model.

6. A system for computationally accessing an analytical model, comprising:

a predictive model markup language (PMML) interrogator configured to parse a PMML file associated with the analytical model and populate tables with information about the analytical model;

a bean creator configured to generate a Java bean to wrap an invocation statement that invokes the analytical model based on the populated tables; and a bean to web services circuit configured to transform the Java bean to a web services document so as to allow the analytical model to be invoked by a user of a web services interface; wherein:

the tables populated by the PMML interrogator comprise:
   a model table containing model identification, model name, model type, model class and attributes fields; and
   a mining field table associated with the model table, the mining field table containing model id, mining field name, optype, outlier, value, usage type, minimum value and maximum value fields;

tables with information about the analytical model also include physical model tables and wherein the physical model tables each include a model name field and a model field;

the PMML interrogator is further configured to extract information from the PMML file to populate the model table and the mining input constraints table;

the PMML interrogator is further configured to parse elements with a model tag to extract the model type, to store the model type in the model type field of the model table and to parse the element with the model tag to extract attributes and storing the attributes in the attributes field of the model table; and the PMML interrogator is further configured to aggregate values from a value attribute to store a list of candidates if an optype is categorical and to parse a univariate stats field for minimum and maximum values if an optype of a value attribute is continuous.

7. The system of claim 6, wherein tables with information about the analytical model also include physical model tables and wherein the physical model tables include a cluster model table, a tree model table and/or a neural network model table.

8. The system of claim 6, wherein the bean creator is further configured to import mining models to respective ones of the physical model tables.

9. The system of claim 8, wherein the bean creator is further configured to query the model and model input constraint tables to retrieve parameters to be applied to the analytical model, to generate a Java bean method to serve as a signature for the analytical model, the signature including a list of the retrieved parameters, to generate validation logic for inputs based on model constraints, to generate an invocation statement to invoke the analytical model and to retrieve results of invocation of the analytical model.

* * * * *